(12) United States Patent
Love et al.

(10) Patent No.: US 7,248,651 B2
(45) Date of Patent: Jul. 24, 2007

(54) LOW COMPLEXITY HIGH PERFORMANCE DECODER AND METHOD OF DECODING FOR COMMUNICATIONS SYSTEMS USING MULTIDIMENSIONAL SIGNALING

(75) Inventors: David J. Love, Garland, TX (US); Srinath Hosur, Plano, TX (US); Anuj Batra, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 731 days.

(21) Appl. No.: 10/644,546

(22) Filed: Aug. 20, 2003

(65) Prior Publication Data

US 2004/0071235 A1    Apr. 15, 2004

Related U.S. Application Data

(60) Provisional application No. 60/405,089, filed on Aug. 21, 2002, provisional application No. 60/404,858, filed on Aug. 21, 2002.

(51) Int. Cl.
*H03D 1/00* (2006.01)
*H04L 27/06* (2006.01)

(52) U.S. Cl. ..................................................... 375/341
(58) Field of Classification Search ........ 375/340–341, 375/262, 265, 316; 714/794
See application file for complete search history.

(56) References Cited

U.S. PATENT DOCUMENTS

| | | | |
|---|---|---|---|
| 6,452,964 B1* | 9/2002 | Yoshida ...................... 375/222 |
| 6,470,047 B1* | 10/2002 | Kleinerman et al. ........ 375/232 |
| 6,496,534 B1* | 12/2002 | Shimizu et al. ............. 375/148 |
| 6,625,236 B1* | 9/2003 | Dent et al. .................. 375/341 |
| 6,901,548 B2* | 5/2005 | Hattori et al. ............... 714/755 |
| 6,928,120 B1* | 8/2005 | Zhang ......................... 375/260 |
| 7,010,051 B2* | 3/2006 | Murayama et al. ......... 375/262 |
| 2002/0181615 A1* | 12/2002 | Kuzimiskiy et al. ........ 375/316 |
| 2003/0128777 A1* | 7/2003 | Linsky et al. ............... 375/327 |
| 2003/0142765 A1* | 7/2003 | Poklemba et al. .......... 375/341 |
| 2004/0196892 A1* | 10/2004 | Reznik ....................... 375/148 |
| 2005/0276254 A1* | 12/2005 | Zhang ......................... 370/343 |

\* cited by examiner

*Primary Examiner*—Jean B. Corrielus
(74) *Attorney, Agent, or Firm*—Steven A. Shaw; W. James Brady; Frederick J. Telecky, Jr.

(57) ABSTRACT

A reduced search space minimum distance decoding algorithm provides average probability of error performance close to that of optimal MAP decoding. The decoding algorithm provides dramatic complexity reductions compared with MAP decoding. A sub-optimal decoder receives signal vectors $y_1 \ldots y_k$. Soft output bits are generated as is a reduced search space V via a reduced search space table creation unit in response to the soft output bits and an estimated channel H. A signal vector b is generated via a maximum likelihood decoding unit in response to the reduced search space V and the signal vectors $y_1 \ldots y_k$.

23 Claims, 3 Drawing Sheets

LOW COMPLEXITY HIGH PERFORMANCE DECODER AND METHOD OF DECODING FOR COMMUNICATIONS SYSTEMS USING MULTIDIMENSIONAL SIGNALING

CLAIM TO PRIORITY OF PROVISIONAL APPLICATION

This application claims priority under 35 U.S.C. § 119(e)(1) of provisional application Ser. No. 60/404,858, entitled Two-Layer Interference Cancellation for Communications Systems Using Multidimensional Signaling, filed Aug. 21, 2002, by David J. Love, Srinath Hosur and Anuj Batra; and provisional application Ser. No. 60/405,089, entitled Low-Complexity Bit Based Reduced Subspace Maximum Likelihood Decoding for Communications Systems Using Multidimensional Signaling, filed Aug. 21, 2002, by David J. Love, Srinath Hosur and Anuj Batra.

BACKGROUND OF THE INVENTION

1. Field of the Invention

This invention relates generally to communications systems using multidimensional signaling. More particularly, this invention relates to a sub-optimal minimum distance decoder and method of decoding that outperforms known sub-optimal decoders used in multiple-input multiple-output (MIMO) communication systems.

2. Description of the Prior Art

Multiple-input multiple-output (MIMO) communication systems provide gains in capacity and quality compared to single-input single-output (SISO) communication systems. Examples of MIMO systems include but are not limited to: 1. A narrowband wireless communication system employing multiple-antenna at the transmitter and/or receiver; 2. A broadband communication system employing orthogonal frequency division multiplexing (OFDM); 3. A time division multiple access system; 4. Any multiuser communication system; and/or 5. Any combination of 1-4 above.

These systems commonly employ a block structure where the transmitter (here transmitter refers to the collection of SISO transmitters) sends multidimensional symbol information. This multidimensional symbol could, but is not limited to, be represented by a vector or matrix. The multidimensional symbol might represent one or more coded or uncoded SISO data symbols. The receiver (here receiver refers to the collection of SISO receivers) receives one of more copies of this transmitted symbol vector. The performance of the entire communication system hinges on the ability of the receiver to find reliable estimates of the multidimensional symbol that was transmitted.

Definitions

As used herein, bolded capitol symbols, such as H, represent matrices.

As used herein, bolded lower-case symbols, such as s, represent vectors.

As used herein, $^T$ denotes matrix transposition.

As used herein, * denotes the matrix conjugate transpose operation.

As used herein, $^{-1}$ denotes the matrix inverse operation.

As used herein, if W is a matrix, $W_m$ denotes the mth column of W.

As used herein, if W is a matrix, $(W^T)_m$ denotes the mth row of W.

As used herein, if v is a vector, $\|v\|_2$ denotes the 2-norm of v.

As used herein, if Q(·) represents the symbol slicing function, it will be assumed to slice both single symbols and multi-dimensional symbol vectors.

As used herein, $I_M$ represents the M by M identity matrix.

As used herein, $O_{M \times N}$ represents the M by N matrix of zeros.

As used herein, if A and B are sets, then A|B is the set of all elements in A that are not in B.

For MIMO systems such as, but not limited to, the ones discussed herein above, the received signal can be written in the form $$y_k = \Sigma_n H_n s_{k-n} + v \qquad (1)$$

where $H_n$ is an $M_r$ by $M_t$ matrix of complex gains, $s_k$ is the $M_t$-dimensional symbol vector transmitted at time k, and v is a $M_r$-dimensional vector of additive noise. In narrowband wireless systems where the symbol period is much larger than the RMS delay spread as well as OFDM systems, each SISO channel is often modeled as a single-tap complex gain. In this case equation (1) simplifies to $$y_k = H s_k + v \qquad (2)$$

where H is now an $M_r$ by $M_t$ matrix of complex numbers and $H s_k$ is the matrix product of H and $s_k$.

The receiver must estimate the symbol matrix $S = [s_1 \ldots s_T]$ in order to facilitate reliable communication. Examples, but by no means the only examples, of multidimensional symbols could be space-time codes where T>1 or spatial multiplexing systems with T=1 and independent SISO modulation on each transmit stream. If v were not present and H were invertible, this would simply be the problem of inverting H. The presence of noise however, increases the difficulty of estimating S. The receiver is generally assumed to have some estimate of H available to it. As well, the symbol matrix S is assumed to be chosen from a finite set C of possible multidimensional symbols.

The optimal solution in the sense of minimizing the probability of symbol error has been shown to be the maximum aposterior (MAP) decoder which is equivalent in the case of equiprobable symbol transmissions to a maximum likelihood (ML) decoder. The ML decoder attempts to find S, the symbol matrix, by using the symbol matrix $\tilde{S}$ that maximizes $p(\tilde{S}|y_1, \ldots, y_T)$ where $p(\cdot|y_1, \ldots, y_T)$ is the conditional probability density function (pdf) of $s_k$ given $y_1, \ldots, y_T$. In real-time communications systems, however, this type of decoder is overly computationally complex. We will call decoders that search over an entire set V and decode to the multidimensional symbol $\tilde{S}$ that minimize some sort of metric minimum distance (MD) decoders. Examples of MD decoders include MAP and ML decoding with V=C.

Algorithms have been proposed that are computationally easier than ML decoding in order to overcome this computational hurdle. Algorithms that perform some form of reduced complexity decoding will be referred to herein as sub-optimal decoders. An example of this type of decoder is successive interference cancellation (SIC). A receiver using SIC decodes each symbol within the symbol vector one at a time. After a symbol is decoded, its approximate contribution to the received vector is subtracted in order to improve the estimate of the next symbol within the symbol vector.

An example of an SIC receiver is the ordered iterative minimum mean squared error (IMMSE) receiver. With a single-tap channel, the receive signal is given by equation (2) above. Letting $s_k = [s_1 \ s_2 \ \ldots \ s_{M_t}]^T$, the ordered IMMSE operates using the following steps, letting $y_{k,0} = y_k$, $D_0 = \{1, 2, \ldots, M_t\}$, and $H_k^{(0)} = H$.

1. Set $m = 0$.

2. Compute $W^m = \left(H_k^{(m)+} H_k^{(m)} + \rho I_{M_{t-m}}\right)^{-1} H_k^{(m)+}$.

3. Let $n = \underset{i \in D_0}{\operatorname{argmin}} \|(W^{(m)T})_i\|_2$.

4. Set $\tilde{s}_{k,n} = Q(y_{k,m}^T (W^{(m)T})_i)$.

5. Set $y_{k,m+1} = y_{k,m} - H_{k,n}^{(m)} \tilde{s}_{k,n}$, $D_{m+1} = D_m \setminus \{n\}$, and $$H_k^{(m+1)} = [H_{k,1}^{(m+1)} H_{k,2}^{(m+1)} \ldots H_{k,n-1}^{(m+1)} 0_{M_r \times 1} H_{k,n+1}^{(m+1)} \ldots H_{k,M_t}^{(m+1)}].$$

6. Repeat steps 1-5 for $m < M_t$.

7. Set the decoded symbol vector to $\tilde{s}_k = [\tilde{s}_{k,1} \, \tilde{s}_{k,2} \ldots \tilde{s}_{k,M_t}]^T$.

Regarding the above algorithm, it is important to note that $$H_{k,i}^{(m+1)}$$

denotes the ith row of the matrix $H_k^{(m+1)}$ (time k and iteration m+1). Another example is the zero-forcing decoder which decodes to the symbol $\tilde{s}_k = Q(H^{-1} y_k)$. This decoder is usually considered the worst performing and least complex of the sub-optimal decoders.

Sub-optimal techniques unfortunately differ in diversity order from ML decoding (i.e. the asymptotic slope of the average probability of bit error curve). They essentially trade reduced complexity for reduced performance.

In view of the foregoing, it is both advantageous and desirable to find other low complexity schemes that, while still being low complexity, perform closer to an ML decoder.

SUMMARY OF THE INVENTION

The present invention is directed to a sub-optimal minimum distance (MD) decoder that outperforms known sub-optimal decoders used in multiple-input multiple-output (MIMO) communication systems.

According to one embodiment, a sub-optimal MD decoder creates a reduced search space by searching over the symbol matrices corresponding to a subset E of all possible bit patterns of the transmitted symbol. The bit locations of the subset can be determined using some criterion such as the weakest bit positions. Note also that even among the selected bit locations, the bit patterns and hence the corresponding symbols could be further restricted to a smaller subset. The subset E could be pre-determined or could be adaptively deduced.

According to another embodiment, a sub-optimal decoder employs an algorithm using reduced subspace decoding methods with an added layer of interference cancellation.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
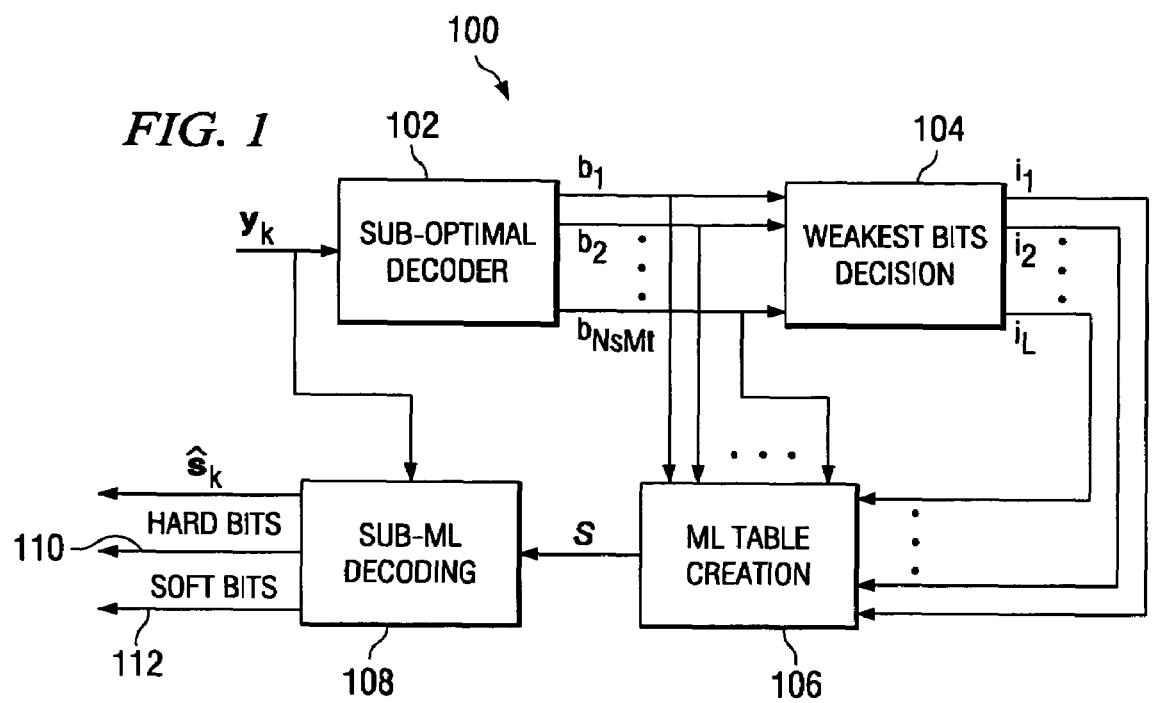
FIG. 1 is a block diagram illustrating a reduced search space minimum distance decoding algorithm according to one embodiment of the present invention.

FIG. 1 is a block diagram illustrating a reduced search space maximum likelihood decoder 100 according to one embodiment of the present invention. Decoder 100 can be used to implement a decoder that provides performance close to MAP decoding with only a small complexity increase over sub-optimal decoding. A received signal vectors $y_1 \ldots y_k$ with k a positive integer are fed into a sub-optimal decoder 102 that may include, but are not limited to, ordered iterative minimum mean-squared error decoders and zero-forcing decoders. The only requirement that needs to be imposed on the soft decoder 102 is that it provides soft bit information. This soft bit information may be in the form, but is not limited to, log-likelihood information. The sub-optimal decoder 102 soft output bits, $b_1$, $b_2, \ldots, b_{N_s}$, where $N_s$ is the number of bits per multidimensional symbol are then fed into a block 104 that creates a set E of search patterns. An example, but not the only example, of the block could be one that returns the set E of all possible bit combinations in the bit positions $i_1, i_2, \ldots, i_L$ where the positions correspond to the smallest magnitude soft bit locations with L being some integer. This set of search patterns E is next fed into a reduced search space creation unit 106. The reduced search space creation unit 106 creates a search space V, $V \subseteq C$, of multidimensional symbols. Each symbol vector in the search space corresponds to a different bit error pattern. Minimum distance decoding is then performed as shown in block 108 using the reduced search space V to return either an estimated transmitted symbol $\hat{S}$, soft bit information, or hard bit information using a metric m. Examples of the metric could be, but are not limited to, performing ML decoding or performing MAP decoding.

Although sub-optimal minimum distance decoder 100 requires additional complexity compared to a simple sub-optimal decoder, decoder 100 provides numerous advantages over a simple sub-optimal decoder. Decoder 100 allows an adjustable search space size by varying the number of bit search patterns in the set E, as stated herein before. This feature allows tradeoffs between performance and complexity. Decoder 100 provides performance that lies close to optimal MAP decoding. Further, decoder 100 can be implemented as an additional stage to known existing sub-optimal decoders.

Figure 2:
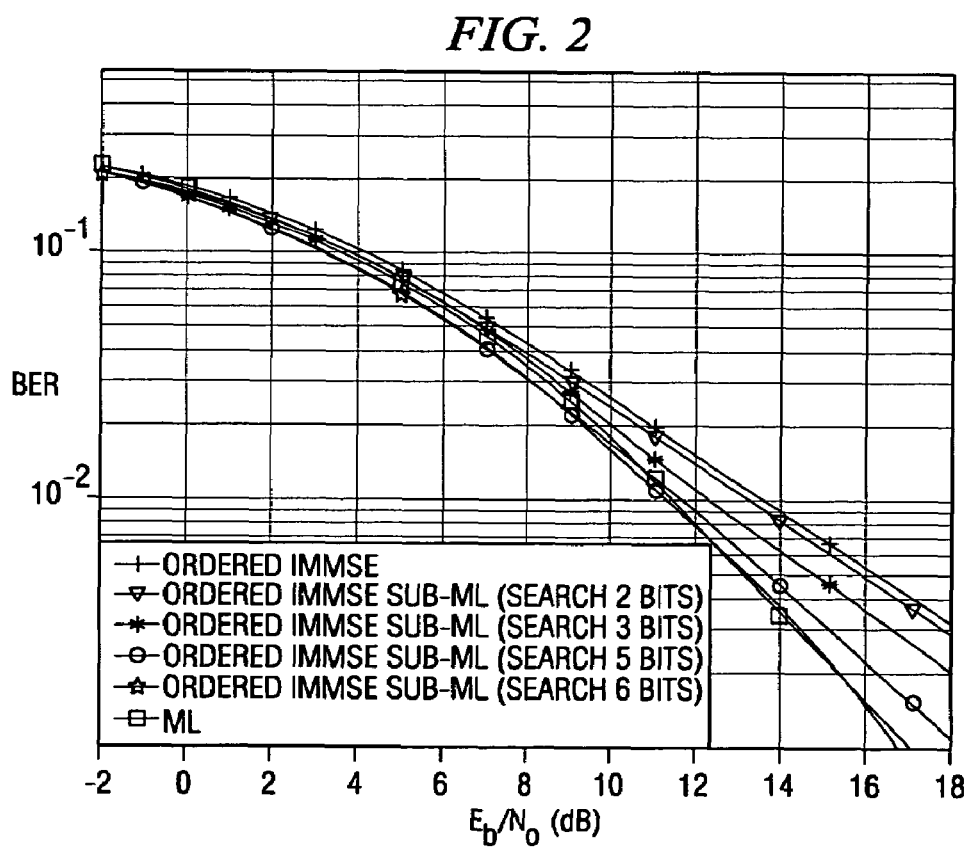
FIG. 2 is a graph comparing bit error rate performance between ordered IMMSE based sub-ML, ordered IMMSE, and ML decoding, for T=1 and S created by using 16-QAM on each stream using the algorithm depicted in FIG. 1.

Any type of sub-optimal decoder that outputs soft bit information can be combined with reduced search space maximum likelihood decoding, as stated herein before. Decoder 100 was simulated by the present inventors using two different types of sub-optimal decoders, including ordered IMMSE decoding and unordered zero-forcing decoding. In each simulation S was created using T=1 and independent 16-QAM modulation on each stream. FIG. 2 is a graph comparing bit error rate performance between ordered IMMSE based sub-ML, ordered IMMSE, and ML decoding, using the decoding algorithm depicted in FIG. 1. With a 2-bit or 4-symbol vector search space, the decoder 100 displays a diversity order that is approximately the same as ordered IMMSE with about a 0.2 dB gain. With a 3-bit or 8-vector search space, the BER curve for the decoder seems to have a diversity slope that lies between ordered IMMSE and ML decoding. At a BER of $10^{-2}$, the 8-vector search space decoder is approximately 1.2 dB better than ordered IMMSE and 1.2 dB worse than ML. The 5-bit or 32-vector search space actually outperforms ML decoding up to a bit SNR of about 13 dB.

Figure 3:
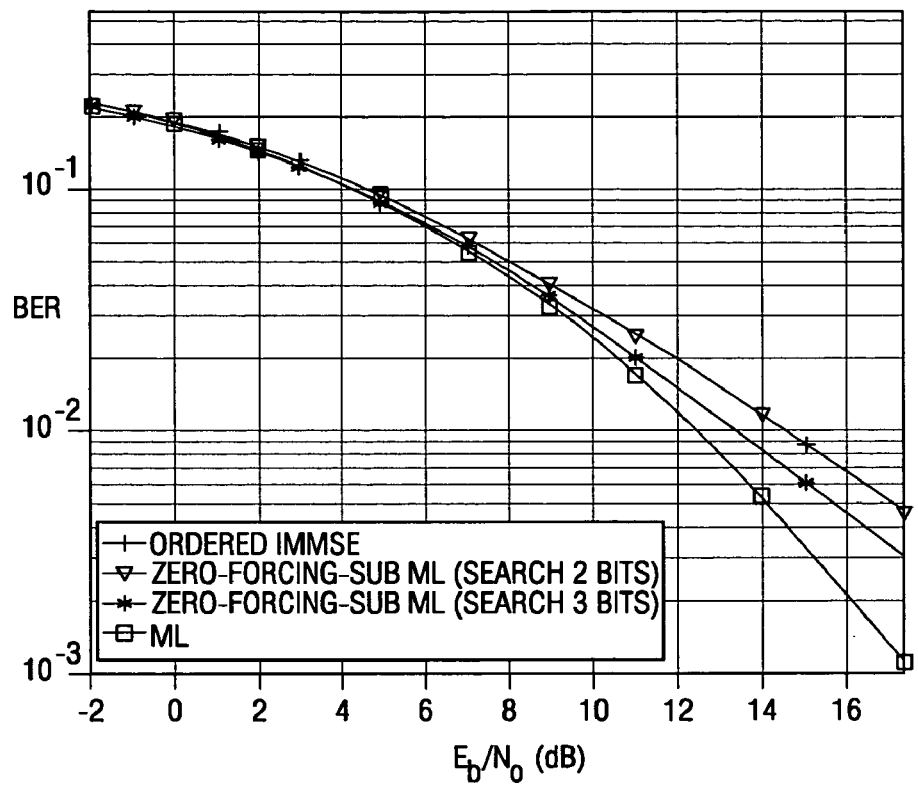
FIG. 3 is a graph comparing bit error rate performance between unordered zero-forcing based sub-ML, ordered IMMSE, and ML decoding for T=1 and S created by using 16-QAM on each stream using the algorithm depicted in FIG. 1.

FIG. 3 is a graph comparing bit error rate performance between unordered zero-forcing based sub-ML, ordered IMMSE, and ML decoding using the algorithm depicted in FIG. 1. Unordered zero-forcing is much less complex than ordered IMMSE decoding. It can be seen that with a search space of 2-bits or 4-vectors, the decoder 100 seems to perform exactly the same as ordered IMMSE. The diversity advantage of this advantage of this decoding scheme appears with a search space of 3-bit or 8-vector. The performance matches that of the ordered IMMSE based sub-ML decoding almost exactly here. At a BER of $10^{-2}$, the 8-vector search space decoder is once again approximately 1.2 dB better than ordered IMMSE and 1.2 dB worse than ML.

Figure 4:
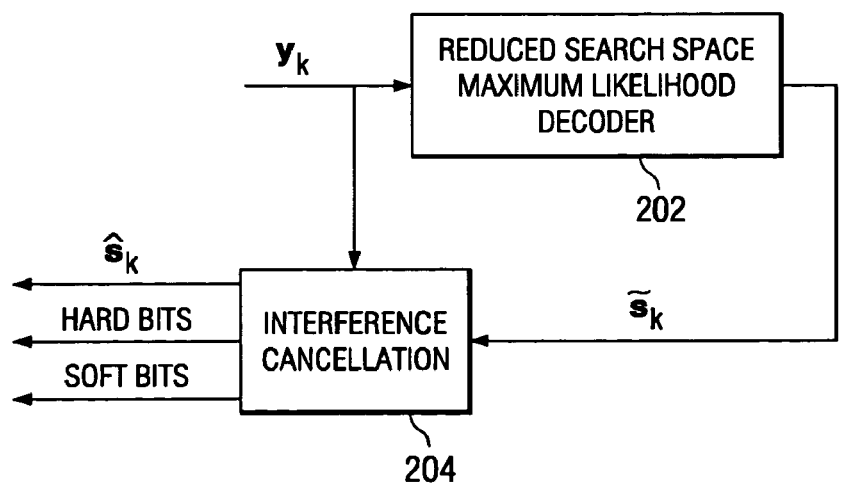
FIG. 4 is a block diagram illustrating a two-layer interference cancellation decoder according to one embodiment of the present invention.

FIG. 4 is a block diagram illustrating a two layer interference cancellation decoder 200 according to one embodiment of the present invention. Decoder 200 was found by the present inventors to also provide performance between sub-optimal and MAP decoding with only a small complexity increase over sub-optimal decoding. In the case T>1 this decoder operates column by column. A received signal vector $y_k$ is fed into a RSS decoder 202. Examples of the RSS decoder include, but are not limited to, sphere decoding, hierarchical decoding, concatenated RSS decoding, and the decoder proposed herein. RSS decoder 202 returns a hard symbol vector estimate of $\tilde{S}$. The decoder 200 then decodes to $\hat{S}$ by performing interference cancellation via block 204 on each symbol, and then making a decision. This interference cancellation can be done many different ways using algorithms such as zero-forcing or minimum-mean-squared-error (MMSE) decoding. One example based on two-layer zero-forcing is set forth in steps 1-5 below, assuming that $H_m$ is the mth column of H (estimated channel that may be estimated within another block or supplied externally).

1. Set $m = 1$.

2. Compute $w_m = (H_m)^+$.

3. Set $\hat{s}_{k,m} = Q\left(w_m\left(y_k - \sum_{i=1, i \neq m}^{M_t} H_i \tilde{s}_{k,i}\right)\right)$.

4. Repeat steps 1-3 for $m < (M_t + 1)$.

5. Set the decoded symbol vector to $\hat{s}_k = [\hat{s}_{k,1} \ \hat{s}_{k,2} \ \ldots \ \hat{s}_{k,M_1}]^T$.

Although decoder 200 is more complex when compared with a simple interference cancellation decoder, and does not perform as well as an RSS ML decoder, decoder has several advantages. One advantage of two layer interference cancellation decoder 200 is that it provides performance close to MAP decoding. Further, decoder 200 is more easily implemented for systems using outer error control coding than are RSS decoders. Decoder 200 can be seen to have dramatically reduced complexity compared with MAP decoding techniques. The present inventors also found that decoder 200 could be easily implemented as an additional stage to known hard decision RSS decoder implementations.

Figure 5:
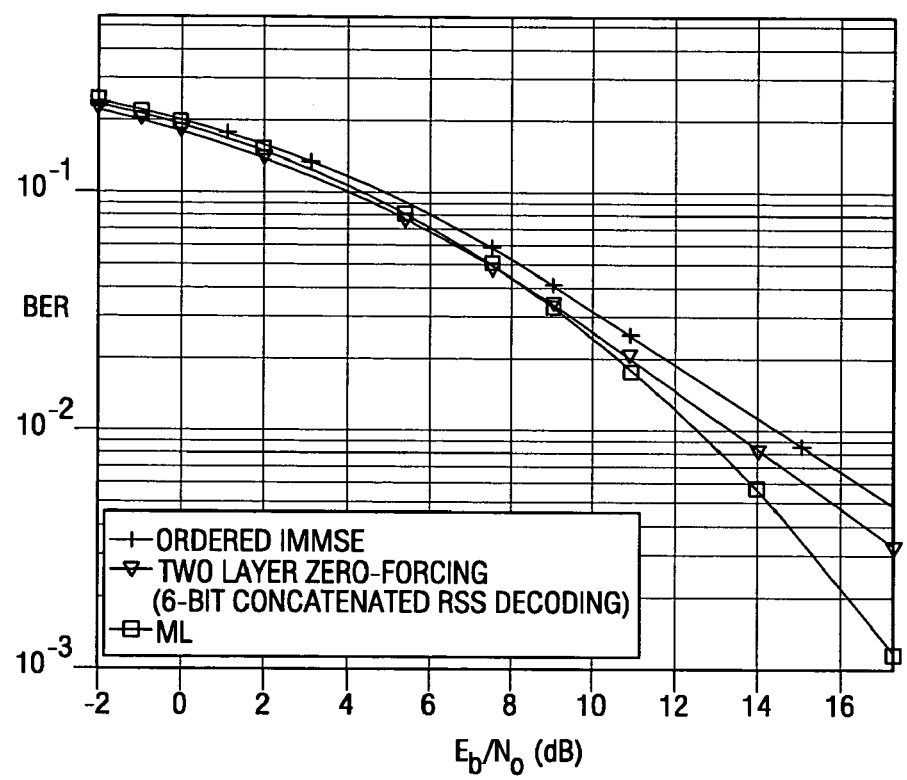
FIG. 5 is a graph comparing bit error rate performance of the decoder shown in FIG. 6 with ordered IMMSE and ML decoding using T=1 and S created by using 16-QAM on each stream.

Decoder 200 was simulated by the present inventors using concatenated RSS ML decoding followed by zero-forcing. The systems were all simulated for a 2×2 antenna wireless system using T=1. FIG. 5 is a graph comparing bit error rate performance of the decoder 200 shown in FIG. 4 with ordered IMMSE and ML decoding when using T=1 and 16-QAM on each stream and a 6-bit RSS ML decoder simulated for a flat fading channel. Decoder 200 can be seen to provide approximately a 1 dB performance gain over ordered IMMSE decoding.

Figure 6:
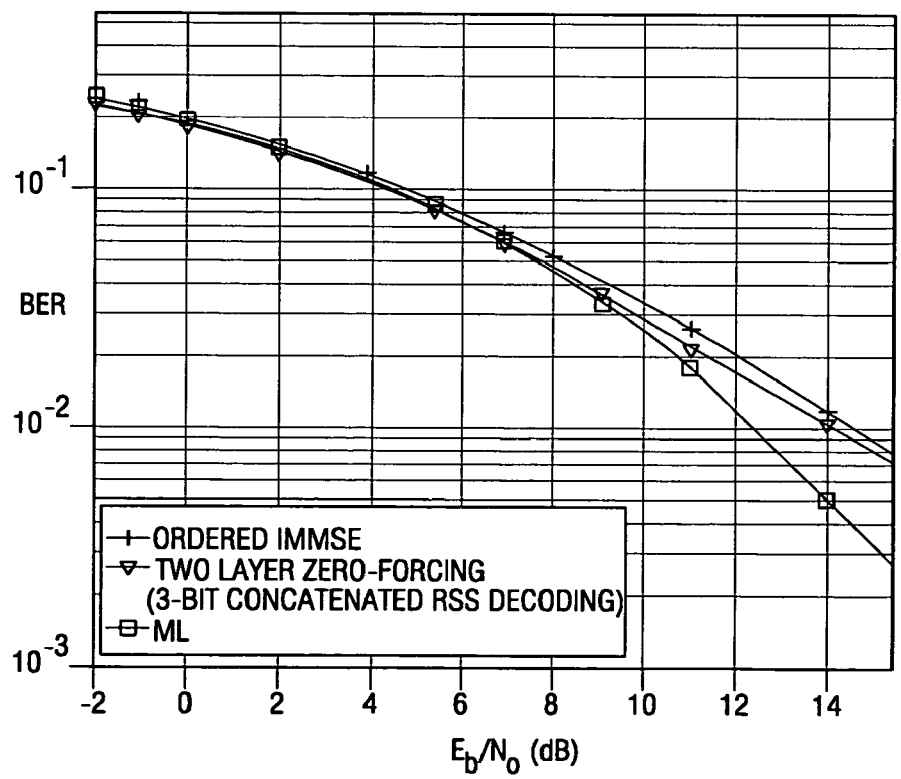
FIG. 6 is a graph comparing bit error rate performance of the decoder shown in FIG. 6 with ordered IMMSE and ML decoding for a channel having two paths using T=1 and S created by using 16-QAM on each stream.

FIG. 6 shows the bit error rate performance of an orthogonal frequency division multiplexing (OFDM) system in which decoder 200 employs a 3-bit RSS ML decoder simulated for a two path channel. The decoder 200 decodes the two element symbol vector sent on each frequency tone independently. The OFDM system forces each tone to have flat fading. It can be seen that decoder 200 provides approximately a 0.25 dB performance increase over ordered IMMSE decoding.

In summary explanation, a reduced search space minimum distance decoder/decoding algorithm has been described that provides average probability of error performance close to optimal MAP decoding. A sub-optimal minimum distance (MD) decoder employs the reduced search space minimum distance decoder/decoding algorithm to outperform known sub-optimal decoders used in multiple-input multiple-output (MIMO) communication systems. The decoder allows the system designer to make tradeoffs between complexity and performance by easily adjusting the search space size. As two layer interference cancellation decoder has also been described for MIMO communication systems, that also provides performance close to optimal MAP decoding. Although the two layer interference cancellation decoder is based on reduced subspace decoding, it is much easier to implement than corresponding reduced subspace ML decoders.

In view of the above, it can be seen the present invention presents a significant advancement in the art of multiple-input multiple-output (MIMO) communication systems. Further, this invention has been described in considerable detail in order to provide those skilled in the sub-optimal decoder art with the information needed to apply the novel principles and to construct and use such specialized components as are required.

Further, in view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow. For example, a sub-optimal decoder has been described which generates the decoded symbol estimate. Bit patterns E were chosen which were a subset of the total $(Ns)^{Mt}$ possible patterns for further processing. The choice of these bit patterns could be 1) fixed once and for all (could be because of some pre-known knowledge); 2) fixed before-hand but changing from symbol to symbol; 3) determined once during reception and fixed for all symbols; and/or 4) changed from symbol to symbol. The choice of which E can be either arbitrary or based on some measure such as signal "strength", preprocessing SNR, probability of error, improvement in post processing SNR, total available computation resources, power, and the like, or any combination of the foregoing criterion. Those skilled in the art will appreciate that although E was chosen to correspond to the L weakest bits, and was predetermined and fixed, one could alternatively have used a threshold on the criterion and used only the bits which did not satisfy this threshold criterion.

In the choice where E was chosen to correspond to those bits from some L bit locations, the L bit locations could be 1) fixed before hand for all symbols; 2) fixed before-hand but changing from symbol to symbol; 3) adaptively determined from some training or the received signal and fixed for all symbols; and/or 4) adaptively changing from symbol to symbol. Again, the choice is arbitrary or based on some measure such as signal "strength", preprocessing SNR, probability of error, improvement in post processing SNR, total available computation resources, power, and the like, or some combination of the foregoing criterion. Although a fixed L was described herein above, the locations were determined by a "weakest criterion" for all symbols.

What is claimed is:

1. A method of decoding a signal vector, the method comprising:
   receiving signal vectors $y_1 \ldots y_k$ into a sub-optimal decoder and generating soft output bits therefrom;
   generating a reduced search space V via a reduced search space table creation unit in response to the soft output bits and an estimated channel H; and
   generating a signal vector $\hat{S}_k$ via a maximum likelihood decoding unit in response to the reduced search space V and the signal vectors $y_1 \ldots y_k$.

2. The method according to claim 1, wherein the reduced search space V is constructed by searching over L indices, L>0 within a transmitted bit vector.

3. The method according to claim 2, wherein L has a value that is chosen and fixed only once.

4. The method according to claim 2, wherein L has a value that is chosen adaptively.

5. The method according to claim 2, wherein L has a different value for every receive interval and wherein a receive interval is defined to comprise at least one symbol.

6. The method according to claim 5, wherein the receive interval has a length that is chosen adaptively.

7. The method according to claim 1, wherein the reduced search space V is constructed as a subset of the set of all possible bit combinations in L indices, L>0, of a transmitted bit vector, where the size of the subset is >0.

8. The method according to claim 7, wherein L has a value that is chosen and fixed only once.

9. The method according to claim 7, wherein L has a value that is chosen adaptively.

10. The method according to claim 7, wherein L has a different value for every receive interval and wherein a receive interval is defined to comprise at least one symbol.

11. The method according to claim 10, wherein the receive interval has a length that is chosen adaptively.

12. The method according to claim 7, wherein the subset is defined adaptively.

13. The method according to claim 7, wherein the subset is predetermined.

14. The method according to claim 1, wherein the signal vector $\hat{S}_k$ is represented by the relationship $$\hat{s}_k = \underset{v \in V}{\mathrm{argmin}} m(y_1, \ldots, y_k, v),$$

and wherein m is a metric.

15. The method according to claim 14, wherein m varies with the estimated channel H.

16. The method according to claim 14, wherein m does not vary with the estimated channel H.

17. The method according to claim 1 further comprising the step of generating hard bits via a minimum distance decoding unit in response to the reduced search space V and the signal vectors $y_1 \ldots y_k$.

18. The method according to claim 1 further comprising the step of generating soft bits via a minimum distance decoding unit in response to the reduced search space V and the signal vectors $y_1 \ldots y_k$.

19. A reduced search space decoder comprising:
   a sub-optimal decoder configured to receive a signal vector $y_1 \ldots y_k$ and generate soft output bits therefrom;
   a decision unit coupled to said sub-optimal decoder and configured to generate a set E of error bit error patterns;
   a reduced search space table creation unit coupled to said sub-optimal decoder and said decision unit, said reduced search space table creation unit configured to generate a reduced search space V in response to the soft output bits and a set of L indices, L>0; and
   a minimum distance decoder configured to generate a multidimensional signal $\hat{S}_k$ in response to the reduced search space V and the signal vector $y_1 \ldots y_k$.

20. The reduced search space decoder according to claim 19 wherein the minimum distance decoder is further configured to generate hard bits in response to the reduced search space V and the signal vectors $y_1 \ldots y_k$.

21. The reduced search space decoder according to claim 19 wherein the minimum distance decoder is further configured to generate soft bits in response to the reduced search space V and the signal vectors $y_1 \ldots y_k$.

22. A reduced search space decoder comprising:
   a reduced search space (RSS) decoder configured to receive symbol vectors $y_1 \ldots y_k$ and generate a hard symbol vector estimate $\hat{S}$ therefrom; and
   an interference cancellation decoder configured to generate a hard symbol vector $\hat{S}$ in response to the symbol vectors $y_1 \ldots y_k$ and the hard symbol vector estimate $\tilde{S}$ and further configured to generate hard bits and soft bits in response to the symbol vectors $y_1 \ldots y_k$ and the hard symbol vector estimate $\tilde{S}$.

23. A method of decoding a signal vector, the method comprising:

receiving a symbol vector $y_1 \ldots y_k$ via a reduced search space maximum likelihood decoder and generating a hard symbol vector estimate $\tilde{S}$ therefrom; and decoding the hard symbol vector estimate $\tilde{S}$ via interference cancellation on each symbol and making a decision associated with the received symbol vector $y_1 \ldots y_k$ and the hard symbol vector estimate $\tilde{S}$ to generate a symbol vector $\hat{S}$ by using a two-layer zero-forcing decoding algorithm.

* * * * *